United States Patent
Khoo

(10) Patent No.: US 11,074,312 B2
(45) Date of Patent: Jul. 27, 2021

(54) SYSTEM AND METHOD FOR DYNAMIC IMAGERY LINK SYNCHRONIZATION AND SIMULATING RENDERING AND BEHAVIOR OF CONTENT ACROSS A MULTI-CLIENT PLATFORM

(71) Applicant: Justin Khoo, San Francisco, CA (US)

(72) Inventor: Justin Khoo, San Francisco, CA (US)

(*) Notice: Subject to any disclaimer, the term of this patent is extended or adjusted under 35 U.S.C. 154(b) by 0 days.

(21) Appl. No.: 15/696,152

(22) Filed: Sep. 5, 2017

(65) Prior Publication Data

US 2017/0364494 A1 Dec. 21, 2017

Related U.S. Application Data

(63) Continuation of application No. 14/563,345, filed on Dec. 8, 2014.

(60) Provisional application No. 61/913,419, filed on Dec. 9, 2013.

(51) Int. Cl.
*G06F 40/14* (2020.01)
*G06F 16/957* (2019.01)
*G06F 40/154* (2020.01)
*G06F 40/143* (2020.01)

(52) U.S. Cl.
CPC .......... *G06F 16/957* (2019.01); *G06F 40/143* (2020.01); *G06F 40/154* (2020.01)

(58) Field of Classification Search
CPC .. G06F 17/2247; G06F 17/227; G06F 17/211; G06F 40/143; G06F 40/154; G06F 16/957
USPC ........................................ 715/234, 239, 243
See application file for complete search history.

(56) References Cited

U.S. PATENT DOCUMENTS

| | | | |
|---|---|---|---|
| 6,907,578 B2 | 6/2005 | Wilson et al. | |
| 6,918,082 B1 | 7/2005 | Gross et al. | |
| 7,219,131 B2 | 5/2007 | Banister et al. | |
| 7,305,242 B2* | 12/2007 | Zakharia | G06F 3/04812 455/411 |
| 7,627,814 B1* | 12/2009 | Soldan | G06F 40/146 715/236 |
| 7,814,410 B2* | 10/2010 | Kothari | G06F 17/30905 715/234 |

(Continued)

OTHER PUBLICATIONS

Wilson et al.; Touch and Mouse Together Again for the First Time; Mar. 13, 2013; HTML5Rocks.com; pp. 1-9.*

(Continued)

*Primary Examiner* — Andrew R Dyer
(74) *Attorney, Agent, or Firm* — NDWE, LLP

(57) ABSTRACT

The present invention generally relates to systems and methods for simulation of web based content. Specifically, the systems and methods described herein are configured to provide simulation of the rendering and behavior of web (e.g., HTML) documents within multiple client, browser and device platforms. Although the principles can be generally used, the invention is particularly aimed towards simulating emails within different email clients and devices. Embodiments of the present invention further generally relate to synchronization of links with dynamic imagery provided to a remote computing device. Specifically, these embodiments of the invention relate to a web-based system and method for synchronizing URLs and other hyperlinks to dynamic imagery provided to a remote computing device by a server or other content providing device.

6 Claims, 12 Drawing Sheets

(56) References Cited

U.S. PATENT DOCUMENTS

| | | | | |
|---|---|---|---|---|
| 7,900,149 | B2* | 3/2011 | Hatcher | H04L 51/066 |
| | | | | 715/760 |
| 8,032,597 | B2* | 10/2011 | Khoo | G06Q 10/107 |
| | | | | 709/206 |
| 8,285,813 | B1* | 10/2012 | Colton | G06F 9/54 |
| | | | | 709/217 |
| 8,335,982 | B1* | 12/2012 | Colton | G06F 9/44521 |
| | | | | 715/234 |
| 8,527,860 | B1* | 9/2013 | Colton | G06F 17/30893 |
| | | | | 709/203 |
| 8,639,680 | B1* | 1/2014 | Ciccolo | G06F 16/9535 |
| | | | | 707/706 |
| 8,639,743 | B1* | 1/2014 | Colton | G06F 9/45525 |
| | | | | 709/203 |
| 8,719,451 | B1* | 5/2014 | Colton | G06F 17/3089 |
| | | | | 709/248 |
| 8,898,296 | B2* | 11/2014 | Zeng | G06F 17/30864 |
| | | | | 707/713 |
| 8,959,426 | B1 | 2/2015 | Thakare et al. | |
| 8,984,048 | B1* | 3/2015 | Maniscalco | H04L 67/2847 |
| | | | | 709/203 |
| 9,218,267 | B1* | 12/2015 | Keller | G06F 17/3089 |
| 9,400,774 | B1 | 7/2016 | Kim et al. | |
| 9,424,236 | B2* | 8/2016 | Sullivan | G06F 17/218 |
| 9,607,332 | B1 | 3/2017 | Nazarov et al. | |
| 9,817,916 | B2* | 11/2017 | Flack | G06F 16/986 |
| 10,031,549 | B2* | 7/2018 | Costa | G06F 1/1601 |
| 2001/0042098 | A1 | 11/2001 | Gupta et al. | |
| 2004/0034688 | A1 | 2/2004 | Dunn | |
| 2004/0234169 | A1* | 11/2004 | Tojo | G06K 9/00463 |
| | | | | 382/305 |
| 2004/0268261 | A1* | 12/2004 | Elliott | G06F 3/0484 |
| | | | | 715/716 |
| 2005/0022116 | A1* | 1/2005 | Bowman | G06F 16/986 |
| | | | | 715/234 |
| 2005/0081159 | A1 | 4/2005 | Gupta et al. | |
| 2005/0100143 | A1 | 5/2005 | Bedingfield, Sr. | |
| 2005/0246341 | A1 | 11/2005 | Vuattoux et al. | |
| 2006/0023238 | A1 | 2/2006 | Blaszyk et al. | |
| 2006/0174187 | A1* | 8/2006 | White | G06F 40/154 |
| | | | | 715/235 |
| 2007/0011258 | A1* | 1/2007 | Khoo | G06F 3/0482 |
| | | | | 709/206 |
| 2007/0038718 | A1* | 2/2007 | Khoo | G06Q 10/107 |
| | | | | 709/206 |
| 2007/0201752 | A1 | 8/2007 | Gormish et al. | |
| 2007/0211071 | A1* | 9/2007 | Slotznick | G06F 17/30899 |
| | | | | 345/594 |
| 2008/0005247 | A9* | 1/2008 | Khoo | H04L 51/046 |
| | | | | 709/206 |
| 2008/0307328 | A1* | 12/2008 | Hatcher | H04L 51/066 |
| | | | | 715/760 |
| 2009/0055187 | A1 | 2/2009 | Leventhal et al. | |
| 2009/0112687 | A1 | 4/2009 | Blair et al. | |
| 2010/0031366 | A1 | 2/2010 | Knight et al. | |
| 2010/0241488 | A1 | 9/2010 | Jacobson | |
| 2011/0113364 | A1* | 5/2011 | Neil | H04L 67/10 |
| | | | | 715/802 |
| 2011/0197133 | A1* | 8/2011 | Tarjan | G06F 16/951 |
| | | | | 715/736 |
| 2011/0202621 | A1 | 8/2011 | Laval | |
| 2011/0258532 | A1* | 10/2011 | Ceze | G06F 17/30902 |
| | | | | 715/234 |
| 2011/0314368 | A1* | 12/2011 | Chevalier | G06F 16/958 |
| | | | | 715/234 |
| 2012/0110395 | A1 | 5/2012 | Gearhart et al. | |
| 2012/0155292 | A1* | 6/2012 | Zazula | H04L 41/145 |
| | | | | 370/252 |
| 2012/0173967 | A1* | 7/2012 | Lillesveen | G06F 40/14 |
| | | | | 715/235 |
| 2012/0215540 | A1 | 8/2012 | Goektekin | |
| 2012/0245937 | A1 | 9/2012 | Thenthiruperai et al. | |
| 2012/0278695 | A1 | 11/2012 | Ju et al. | |
| 2012/0278700 | A1* | 11/2012 | Sullivan | G06F 9/44 |
| | | | | 715/235 |
| 2013/0007711 | A1* | 1/2013 | Fryc | G06F 11/3672 |
| | | | | 717/124 |
| 2013/0046616 | A1 | 2/2013 | Williams et al. | |
| 2013/0174010 | A1* | 7/2013 | Le Chevalier | G06F 17/227 |
| | | | | 715/234 |
| 2013/0174011 | A1* | 7/2013 | Le Chevalier | G06F 17/22 |
| | | | | 715/234 |
| 2013/0176344 | A1* | 7/2013 | Mandic | G06F 3/04883 |
| | | | | 345/661 |
| 2013/0179776 | A1* | 7/2013 | Rossi | G06F 3/04883 |
| | | | | 715/236 |
| 2013/0190021 | A1 | 7/2013 | Vieri et al. | |
| 2013/0201107 | A1* | 8/2013 | Rossi | G06F 3/0488 |
| | | | | 345/163 |
| 2013/0205277 | A1* | 8/2013 | Seven | G06F 8/38 |
| | | | | 717/121 |
| 2013/0219024 | A1* | 8/2013 | Flack | H04L 67/2804 |
| | | | | 709/219 |
| 2013/0290786 | A1* | 10/2013 | Artzi | G06F 11/3676 |
| | | | | 714/32 |
| 2013/0325980 | A1 | 12/2013 | Ohayon | |
| 2014/0123036 | A1* | 5/2014 | Bao | G06F 3/0488 |
| | | | | 715/760 |
| 2014/0136944 | A1* | 5/2014 | Harris | G06F 17/211 |
| | | | | 715/234 |
| 2014/0282076 | A1 | 9/2014 | Fischer | |
| 2015/0074518 | A1* | 3/2015 | Rumsey | G06F 17/248 |
| | | | | 715/235 |
| 2015/0082058 | A1* | 3/2015 | Hahm | G06F 3/1454 |
| | | | | 713/320 |
| 2015/0161087 | A1 | 6/2015 | Khoo | |
| 2015/0180811 | A1 | 6/2015 | Cornwell et al. | |
| 2015/0207804 | A1* | 7/2015 | Van Brink | G06F 3/04817 |
| | | | | 726/3 |
| 2015/0242380 | A1* | 8/2015 | Guo | G06F 11/3672 |
| | | | | 715/237 |
| 2015/0309993 | A1* | 10/2015 | Wilde | H04L 67/02 |
| | | | | 715/703 |
| 2016/0132937 | A1* | 5/2016 | Khoo | H04L 51/00 |
| | | | | 705/14.66 |
| 2016/0259773 | A1* | 9/2016 | Jadhav | G06F 3/0484 |
| 2016/0284341 | A1 | 9/2016 | Hirakawa et al. | |
| 2017/0018021 | A1 | 1/2017 | Shekhawat et al. | |
| 2018/0247640 | A1 | 8/2018 | Yassa et al. | |
| 2019/0044902 | A1 | 2/2019 | Teplow et al. | |
| 2019/0073342 | A1 | 3/2019 | Wilson et al. | |
| 2020/0151223 | A1 | 5/2020 | Ly et al. | |

OTHER PUBLICATIONS

Garsiel et al.; How Browsers Work: Behind the scenes of modern web browsers; Aug. 5, 2011; HTML5Rocks.com; pp. 1-52.*

Jquery preventing hover function on touch; Oct. 3, 2013; Stack Overflow; pp. 1-8.*

Mark Goddard; Fixing the Hover event on the iPad/iPhone/iPod; May 21, 2010; blog.0100.tv; pp. 1-4.*

Todd Motto; Building an HTML5 responsive menu with media queries and JavaScript; Mar. 12, 2013; toddmotto.com; pp. 1-16.*

How to Use a Mouse on Your iPad & iPhone [Jailbreak Tips]; Oct. 7, 2012; iphonehacks.com; pp. 1-6.*

Emogrifier; Apr. 25, 2013; pelagodesign.com; pp. 1-2.*

Document Object Model (DOM) Level 3 Events Specification; Nov. 5, 2013; W3C, pp. 1-88.*

Disable; Apr. 29, 20091 Merriam-Webster OnLine; p. 1.*

Concept Share—New Features, Deltek+Concept Share Website, http://www.conceptshare.com/new_features, accessed Jun. 13, 2018 (9 pages).

Concept Share—Tour, Deltek+Concept Share Website, https://www.conceptshare.com/tour, accessed Jun. 13, 2018 (4 pages).

EMailOnAcid.com, EMailOnAcid Website, https://www.emailonacid.com/help-article/how-can-i-run-an-email-test/, accessed Jun. 13, 2018 (7 pages).

(56) References Cited

OTHER PUBLICATIONS

Style Sheet Locations for COMS326; Mar. 30, 2013; Radford.edu; pp. 1-2.
Tali Garsiel; How Browsers Work; Feb. 20, 2010; taligarsiel.com; pp. 1-27.
The Only Proofing Solution Built for Email Campaigns, CampaignWorkHub.com, Dated Oct. 2, 2015, Retrieved on Aug. 28, 2018, Retrieved from the Internet, via the Internet Archive. One continuous document (5 pages).
Litmus, "Verify and Check Your Email with Litmus Checklist", Available Online at <https://litmus.com/email checklist#0>, accessed on Oct. 27, 2018, 7 pages.
Invision, "Free Design Feedback and Collaboration Tool", Available Online at <https://www.invisionapp.com/tour/design-feedback-collaboration-tool/>, accessed on Oct. 27, 2018, 3 pages.
Dave, Shyamal, "Head to Litmus for Email Testing and Marketing Analytics Needs", Available Online at <https://yourstory.com/2012/08/litmus>, Aug. 13, 2012, 2 pages.

* cited by examiner

Client ID determination techniques a. Link/Image URL id*:

<a href="http://link-handler.com/redirect?image_id=img1000&user=bill@yahoo.com">

<img src="http://image-server.com/get_image?image_id=img1000&user=bill@yahoo.com">

* user (email) is used as the client "id"

b. Cookie detection:

```
Client                              Image Server
  |─────── Fetch image ──────────────▶|
  |◀────── Redirect + set cookie ─────|
  |─────── Fetch image + cookie ─────▶|   ◀── Client supports cookie:
                                              OK to use cookie as
                                              client ID
           OR
  |─────── Fetch image (no cookie) ──▶|   ◀── No cookie support
``` c. IP/hostname:

Self explanatory but IP/hostname may not sufficiently identify client as IP may be shared by many.

SYSTEM AND METHOD FOR DYNAMIC IMAGERY LINK SYNCHRONIZATION AND SIMULATING RENDERING AND BEHAVIOR OF CONTENT ACROSS A MULTI-CLIENT PLATFORM

CROSS REFERENCE TO RELATED APPLICATIONS

This application is a continuation of U.S. Non-Provisional application Ser. No. 14/563,345 filed Dec. 8, 2014, which claims the benefit of U.S. Provisional Patent Application No. 61/913,419 filed Dec. 9, 2013, the entire disclosures of which are incorporated herein by reference.

FIELD OF THE INVENTION

The present invention generally relates to systems and methods for simulation of web based content. Specifically, the systems and methods described herein are configured to provide simulation of the rendering and behavior of web (e.g., HTML) documents within multiple client, browser and device platforms. Although the principles can be generally used, the invention is particularly aimed towards simulating emails within different email clients and devices. Embodiments of the present invention further generally relate to synchronization of links with dynamic imagery provided to a remote computing device. Specifically, these embodiments of the invention relate to a web-based system and method for synchronizing URLs and other hyperlinks to dynamic imagery provided to a remote computing device by a server or other content providing device.

BACKGROUND

The need to test websites on different browsers and devices has always been a bane of web developers. Web browsers often render documents slightly different from each other and have varying support of HTML tags and CSS styles. With the popularity of mobile devices, the problem has been compounded as a web developer now has to test code on multiple devices in addition to the desktop.

The problem is even more acute in the space of email design. In the interest of enhancing privacy and security many email clients disable images, strip and modify certain HTML elements and disable JavaScript. Email designers hence often need to follow very strict and narrow design guidelines—being careful to only use the lowest common denominator of HTML so that the design renders nicely in the majority of email clients.

The advent of responsive web design has pushed email designers to use more aggressive designs for example using designs that render in a format that is specially designed for mobile screens when viewed on mobile devices. Currently the method to test designs are to load the designs in all the different email clients or to use an automated "screen capture" service such as Litmus, that loads the designs in the clients using virtual machines and takes a screenshot of the email. The screen capture process is tedious and time consuming since the designer needs to send an email to the various email clients and services and having a screenshot taken.

Therefore, there is a need in the art for a system and method that will allow the simulation of email content being rendered in different clients so that the designer is able to quickly see how the email renders in multiple different email clients and devices. These and other features and advantages of the present invention will be explained and will become obvious to one skilled in the art through the summary of the invention that follows.

SUMMARY OF THE INVENTION

Accordingly, embodiments of the present invention are directed to providing a system and method that will allow the simulation of email content being rendered in different clients so that a designer is able to quickly see how the email renders in multiple different email clients and devices.

According to an embodiment of the present invention, a method for simulating rendering and behavior of content across a multi-client platform, said method comprising the steps of: receiving hypertext markup language (HTML) content at a computing device; loading HTML content in a target client and a web browser on said computing device; comparing, via said computing device, differences in rendering and structure between HTML content loaded in said target client and said web browser; and storing modification parameters for the target client.

According to an embodiment of the present invention, the method further comprises the steps of: modifying said HTML content according to said modification parameters; entering a rendering mode; applying client specific environment in a simulated environment; generating simulated markup output based on said simulated environment and said modification parameters; and displaying said simulated markup output on a display element.

According to an embodiment of the present invention, the method further comprises the steps of: generating modified markup output based on said modification parameters; and displaying said modified markup output on a display element.

According to an embodiment of the present invention, the modified markup output comprises adding a client stylesheet to said HTML content such that the HTML content mimics characteristics of the web browser.

According to an embodiment of the present invention, the modified markup output comprises executing JavaScript to attach event listeners to the elements of the HTML content such that the HTML content mimics characteristics of the web browser.

According to an embodiment of the present invention, the modified markup output comprises modifying the behavior of the browser that is rendering the content itself such that the HTML content mimics characteristics of the web browser.

According to an embodiment of the present invention, the step of comparing differences in rendering and structure between HTML content loaded in said target client and said web browser, comprises the steps of: parsing a Domain Object Model (DOM) Tree to determine elements that may have been removed or added; obtaining computed style of each DOM element within the HTML content; comparing each of the DOM elements to the computed style in an original document; and parsing external, internal and inline styles for changes to the computed styles compared to the original document.

According to an embodiment of the present invention, the step of comparing differences in rendering and structure between HTML content loaded in said target client and said web browser, comprises the steps of: parsing a Domain Object Model (DOM) Tree to determine elements that may have been removed or added; obtaining computed style of each DOM element within the HTML content; comparing each of the DOM elements to the computed style in an original document; and parsing and comparing the HTML content.

According to an embodiment of the present invention, the step of comparing differences in rendering and structure between HTML content loaded in said target client and said web browser, comprises the steps of: parsing a Domain Object Model (DOM) Tree to determine elements that may have been removed or added; obtaining computed style of each DOM element within the HTML content; comparing each of the DOM elements to the computed style in an original document; parsing external, internal and inline styles for changes to the computed styles compared to the original document; and parsing and comparing the HTML content.

According to an embodiment of the present invention, a computerized system for simulating rendering and behavior of content across a multi-client platform, said system comprising: an application module comprising computer-executable code stored in non-volatile memory; a means for communicating data across one or more digital networks, and a processor, wherein said application module, said means for communicating data across one or more digital networks and said processor are operably connected and configured to collectively: receive hypertext markup language (HTML) content; load HTML content in a target client and a web browser; compare differences in rendering and structure between HTML content loaded in said target client and said web browser; and store modification parameters for the target client.

According to an embodiment of the present invention, said means for communicating data across one or more digital networks and said processor are further configured to collectively: modify said HTML content according to said modification parameters; enter a rendering mode; apply client specific environment in a simulated environment; generate simulated markup output based on said simulated environment and said modification parameters; and display said simulated markup output on a display element.

According to an embodiment of the present invention, said application module, said means for communicating data across one or more digital networks and said processor are further configured to collectively: generate modified markup output based on said modification parameters; and display said modified markup output on a display element.

According to an embodiment of the present invention, said application module, said means for communicating data across one or more digital networks and said processor are further configured to collectively: parse a Domain Object Model (DOM) Tree to determine elements that may have been removed or added; obtain computed style of each DOM element within the HTML content; compare each of the DOM elements to the computed style in an original document; and parse external, internal and inline styles for changes to the computed styles compared to the original document.

According to an embodiment of the present invention, said application module, said means for communicating data across one or more digital networks and said processor are further configured to collectively: parse a Domain Object Model (DOM) Tree to determine elements that may have been removed or added; obtain computed style of each DOM element within the HTML content; compare each of the DOM elements to the computed style in an original document; and parse and comparing the HTML content.

According to an embodiment of the present invention, said application module, said means for communicating data across one or more digital networks and said processor are further configured to collectively: parse a Domain Object Model (DOM) Tree to determine elements that may have been removed or added; obtain computed style of each DOM element within the HTML content; compare each of the DOM elements to the computed style in an original document; parse external, internal and inline styles for changes to the computed styles compared to the original document; and parse and comparing the HTML content.

BRIEF DESCRIPTION OF THE DRAWINGS

FIG. 11 is a diagram detailing 3 exemplary embodiments of an identifier capable of tying a client to timer data, in accordance with an embodiment of the present invention.

DETAILED SPECIFICATION

The present invention generally relates to systems and methods for simulation of web based content. Specifically, the systems and methods described herein are configured to provide simulation of the rendering and behavior of web (e.g., HTML) documents within multiple client, browser and device platforms. Although the principles can be generally used, the invention is particularly aimed towards simulating emails within different email clients and devices.

Figure 1:
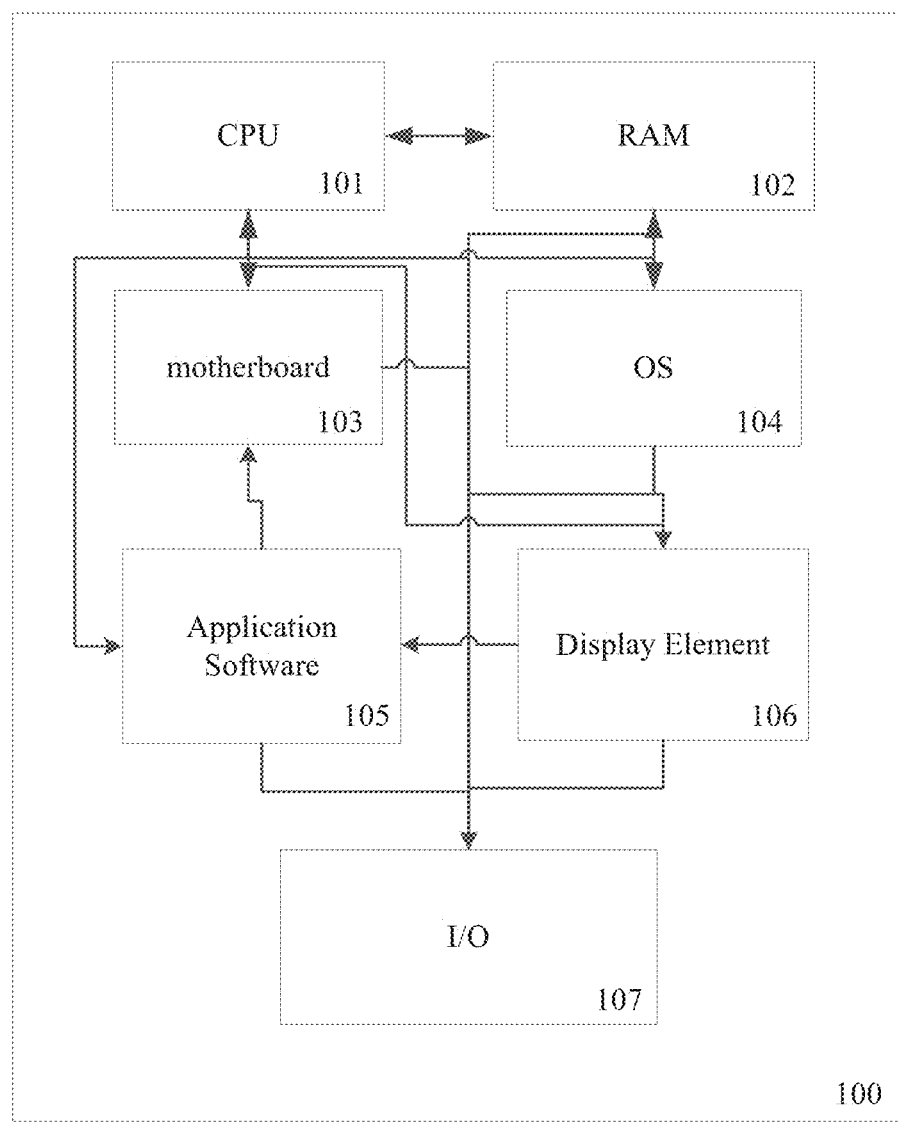
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, one or more programming languages 106 and one or more input/output devices/means 107. Examples of computing devices usable with embodiments of the present invention include, but are not limited to, personal computers, smartphones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
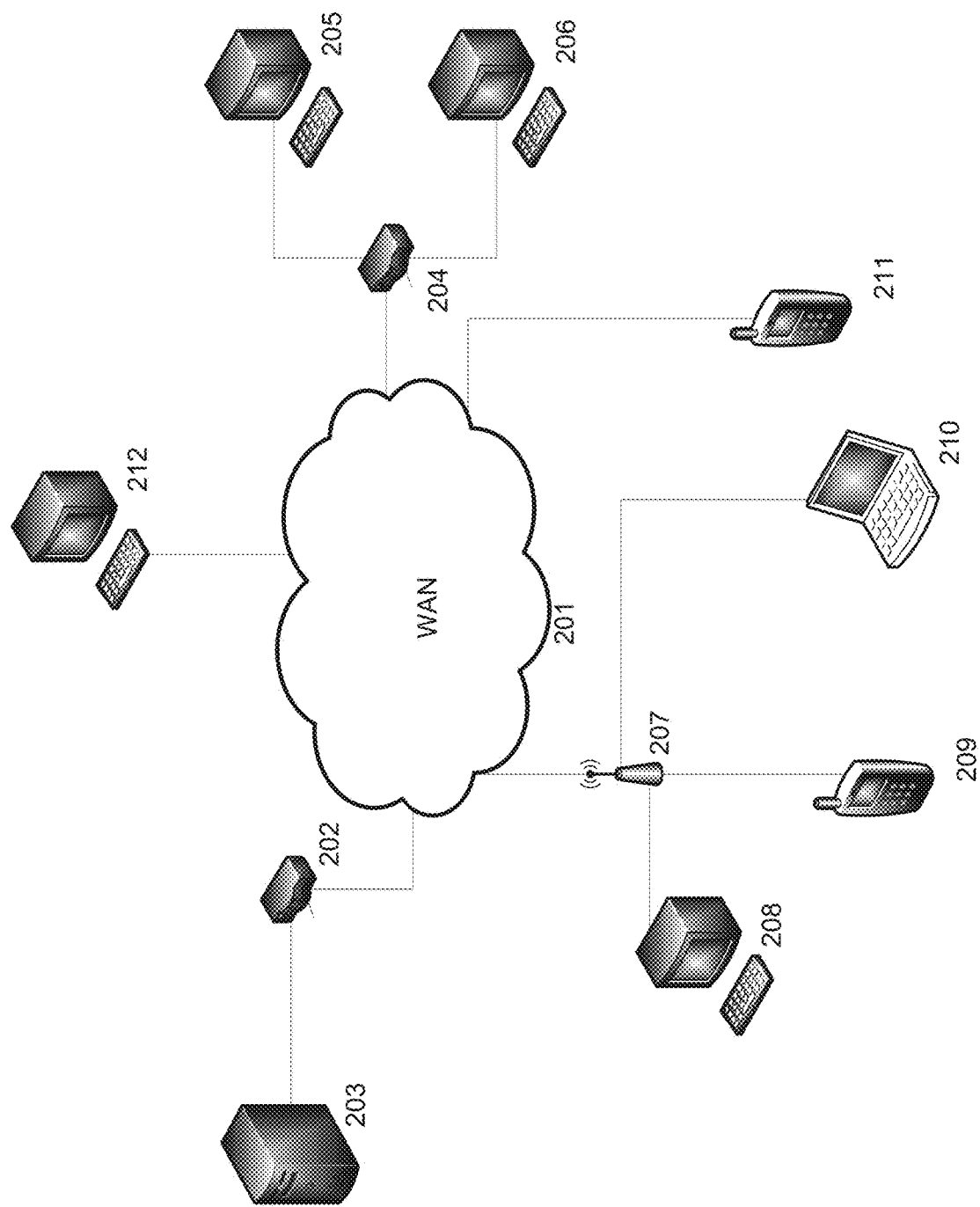
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a Network 201 (e.g., the Internet, a LAN, WiFi, BLUETOOTH, etc.). Applications in server 203 may also be used to manipulate information stored remotely and process and analyze data stored remotely across a Network 201 (e.g., the Internet, a LAN, WiFi, BLUETOOTH, etc.).

According to an exemplary embodiment, as shown in FIG. 2, exchange of information through the Network 201 may occur through one or more high speed connections. In some cases, high speed connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to Network 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via Network 201 or other network in numerous ways. For instance, a component may connect to the system i) through a computing device 212 directly connected to the Network 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, server 203 could be comprised of a personal computing device, such as a smartphone, acting as a host for other computing devices to connect to.

The present invention generally relates to the ability to simulate the rendering of an HTML document in multiple environments. Embodiments of the present invention are particularly beneficial to the testing of email design and the majority of the disclosure will focus on email. However, embodiments of the present invention can be applicable to other instances where HTML is used and not just for email.

As used herein, the term web browser relates to any application that is able to consume and parse HTML content and may be a fully-fledged web-browser, such as FIREFOX® or CHROME®, a component within an application such as the HTML rendering component in MICROSOFT® OUTLOOK® or the IOS® Mail application, or a component without a user-interface such as a headless WEBKIT® engine. The term Client relates to any email client, however client can be interpreted in a broader manner to address other container of HTML content.

Part 1: Programmatic Detection of Characteristic of Client Environment.

An email may render differently in many different clients especially in Webmail environments such as GMAIL®, YAHOO! ® Mail and HOTMAIL®. These clients frequently modify the HTML elements within an email message which may include: (i) stripping certain functionality and tags (i.e. style and script tags); (ii) removing certain styles (i.e. styles that have position set to "absolute"); (iii) modifying certain styles; (iv) adding extra styles (so that the email looks more native to the email client); or (v) any combination thereof. These modifications are referred to as client modification parameters.

Figure 3:
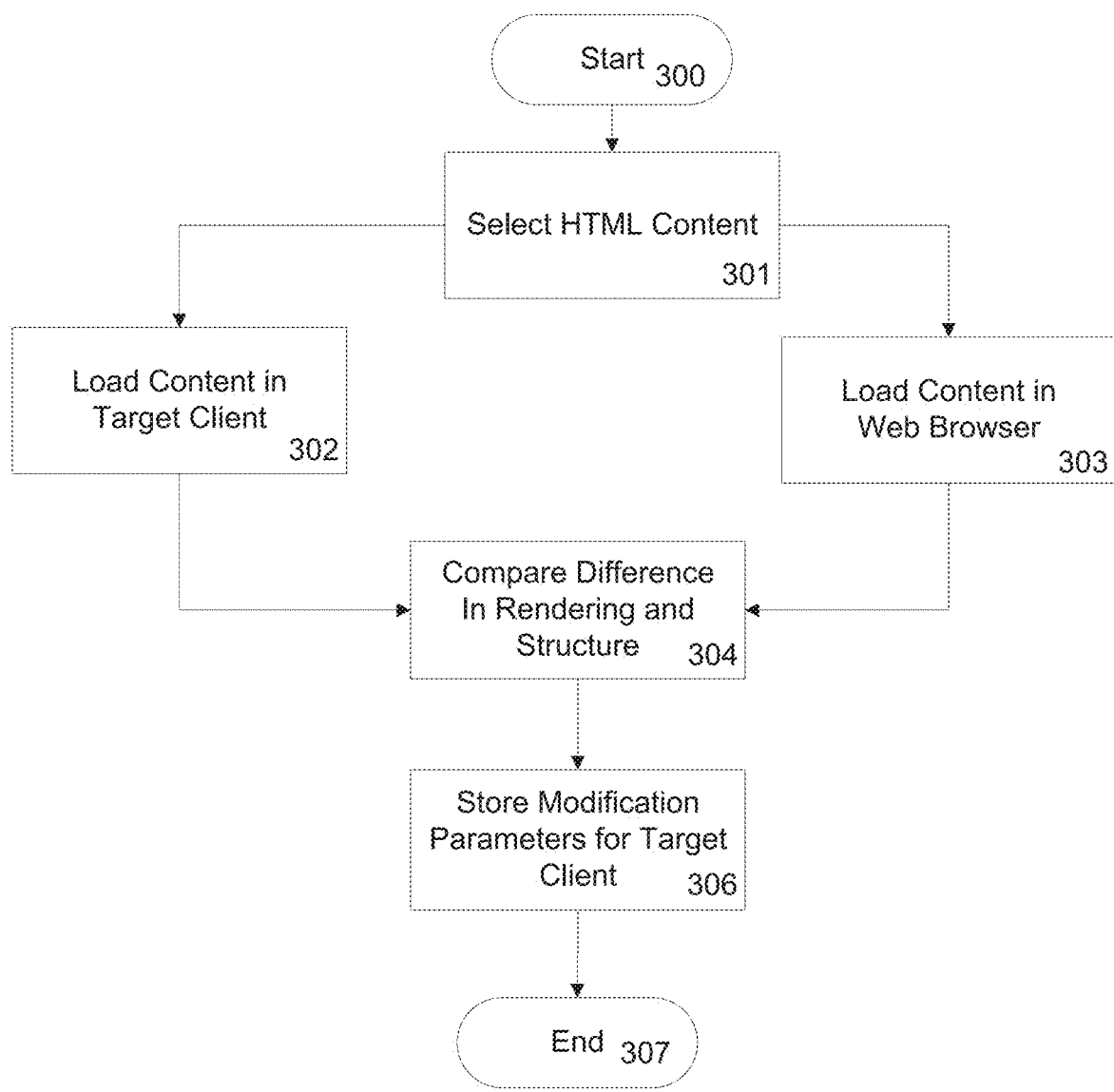
FIG. 3 is an illustration of an exemplary process flow, in accordance with an embodiment of the present invention—depicting the process of determining the modification parameters of a client environment.

A preferred method to detect the modifications performed by the clients involves creating an HTML content containing permutations of HTML tags with CSS styles and tracking the changes made to the markup and behavior of the content when loaded in a web browser and having it loaded in a client. Turning to FIG. 3, at step 301, the document is selected and loaded into a regular web browser 303 as well as a selected client 302. The process of loading the content in a client may differ depending on the type of client. For some clients such as web-based email clients such as HOTMAIL® and GMAIL®, the process may involve sending the content as an email to an address hosted by the web-based email client's servers and logging into the website hosting the web-based email client and then opening the sent message. A preferred embodiment of the invention automates the process of loading content within clients and web browsers by interfacing with applications that are able to programmatically control the execution of web-browsers, such as Selenium Web Driver or other mechanisms familiar to those skilled in the art.

When the HTML content is loaded in the client and web-browser, the original content 303 is then compared to the content rendered in the client 302. According to a preferred embodiment of the present invention, to perform the comparison the system may be configured to use a plugin that attaches to a web-browser or client. The plugin is able to inspect the content rendered within the client. Such plugins are familiar to those skilled in the art. Another method to perform the comparison is to use a scriptable web-browser such as the headless WEBKIT® engine wherein the content loaded by the engine can be accessed by an external application to perform the comparison.

When the email content is rendered, the Document Object Model (DOM) of the content is accessed and one or more of the forgoing processes are performed by the system to determine the modification parameters that have been applied to the original HTML content) 304: (i) parsing of the DOM Tree to determine elements that may have been removed or added; (ii) obtaining computed style (such as font, width, height) of each DOM element within the email and comparing the DOM elements to the computed style in the original document; (iii) parsing the external, internal and inline styles for changes to the styles compared to the original document; (iv) parsing and comparing the HTML document, or (v) any combination thereof.

With respect to (ii) above, the computed style is not limited to the style that has been set directly on the element but includes all other settings that may have cascaded from parent elements and other modifications. For instance, specifically checking the computed style's width and height of an element allows the application to quickly determine if there is a discrepancy in the layout of both documents—which may be caused by among others, differences in font sizes, padding or the removal of certain styles and elements. Obtaining the differences in computed styles allows an application to determine the transformation that has been applied to the email. If certain transformation cannot be determined—for example in the case of unknown changes in dimensions, the offending elements can be identified by the application and marked for manual inspection. The dimension checks allow for a more efficient troubleshooting by a user since it narrows the area of inspection and it identifies minute changes in dimensions that may not be obvious to the naked eye. For certain email documents that are designed to be responsive or change based on the width or size of the container holding the email, the computed style process can be repeated for various container sizes to identify if discrepancies arise in other dimensions and container size.

With respect to (ii) above, by comparing the styles in the email client that are being applied to the content, would result in the transformation that have been applied style wise to the document.

With respect to (iv) above, comparing the HTML of the transformed document and the original document would yield HTML structure changes that may not be detected by the DOM computed style and style sheet parsing routines, but may yield less valuable and actionable data.

In addition to the automated detection of differences, certain modification procedures may require the manual edit of a user to verify and adjust these parameters.

The modification parameters are then recorded and stored 306 with an identifier of the client being tested on so that the parameters can be retrieved later to be applied to content to simulate the client environment. At this point, the process terminates at step 307.

Often clients may change and client modification parameters may become outdated. According to preferred embodiments of the present invention, the system is configured to run a configuration application periodically that will run the above mentioned process on a list of client environments and compare the results to the results obtained prior. If there is a change in the result that matches certain criteria, a client environment can be marked for retest and a notification be sent to an administrator that such change has occurred.

Part 2: Transforming Web Document to Simulate Rendering and Behavior in Client Environment The discussion herein focuses on using the client modification parameters derived from the process of Part 1, and applying them to a web document to simulate the rendering and behavior in targeted client environments.

Figure 5A:
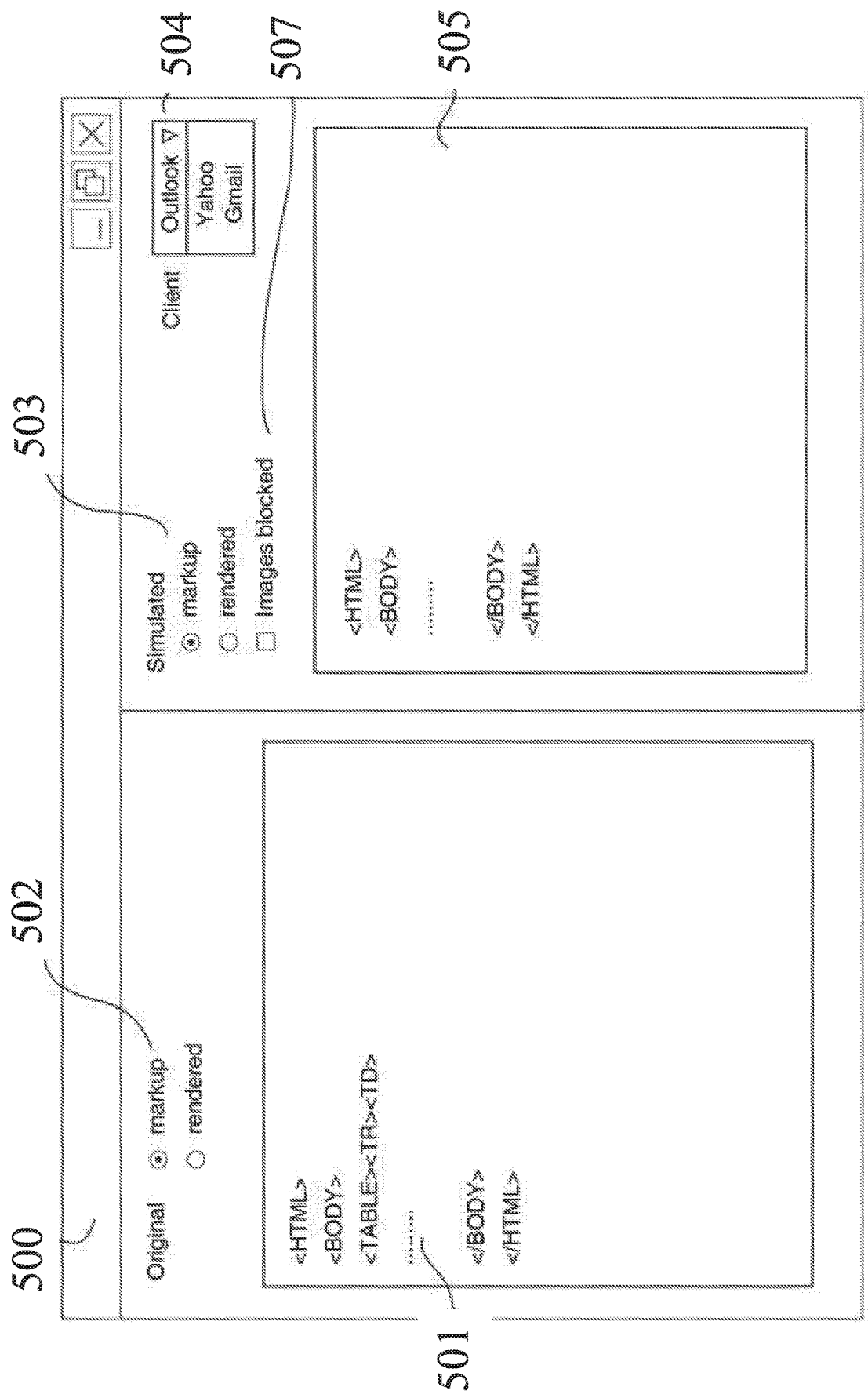
FIGS. 5A and 5B. are illustrations of an exemplary embodiment of a user interface used to simulate the rendering and behavior of content within a client environment.
Figure 5B:
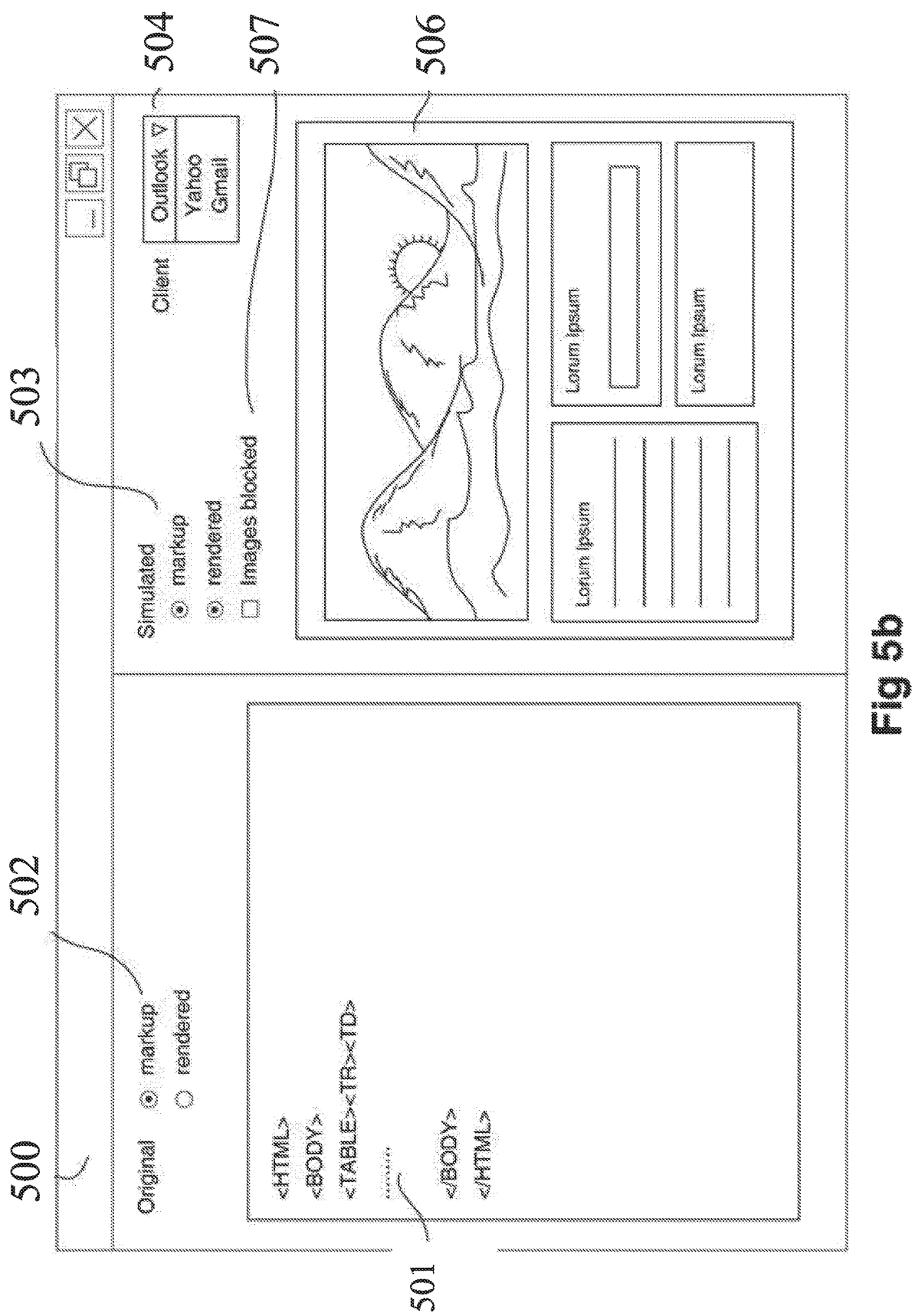

Turning now to FIGS. 5A and 5B. is an illustration of an exemplary embodiment of a user interface used to simulate the rendering and behavior of content within a client environment. The user interface 500 allows a user to input HTML content 501 (including but not limited to CSS and Javascript). The user interface may contain options that allows the user to view the content in multiple ways, including: (i) displaying the HTML content as markup or rendered 502; (ii) displaying the modified HTML content simulated within a selected target client 504 environment as markup or rendered 503; (iii) blocking or displaying images within the rendered view 507; or (iv) any combination thereof.

When the user finishes selecting the options, the user interface may then render the modified HTML content within a view. Element 505 shows the modified content as markup and element 306 shows rendered modified HTML content.

Figure 4:
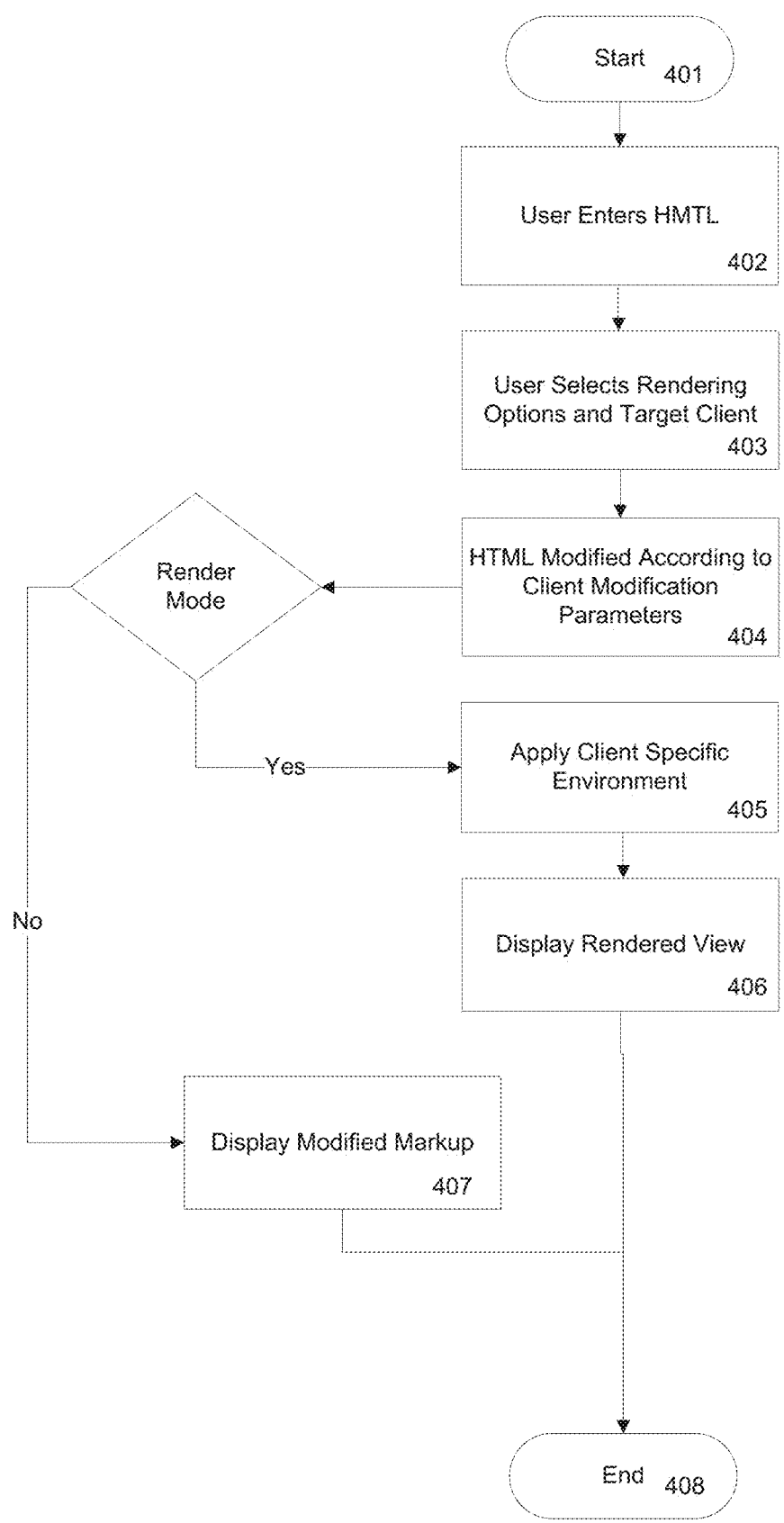
FIG. 4 is an illustration of an exemplary process flow, in accordance with an embodiment of the present invention—depicting the process of simulating the rendering and behavior of content within a client environment.

The forgoing delves into the process to transform HTML content by a user. Turning to FIG. 4, initially the user will load the client simulation tool 401 and enters the HTML content 402. In certain embodiments, the system can be a web-based application hosted on a server and accessed from a web-browser. The user can then select multiple options to render the content within a target client environment 403. In certain embodiments of the present invention, one of the options is the selected client environment.

At step 404, the content is processed by the system wherein the system retrieves the client modification parameters that specify how the content is to be modified to simulate the selected client environment. The HTML markup is altered to simulate how a target client environment would alter the HTML markup. Altering a markup may involve adding, removing and modification of styles as well as adding and removing of HTML elements.

If the user selected to render the simulated output in markup (step 405) then the modified markup is displayed 406 to the user in a window or other graphical user interface (GUI). If the user selected to render the simulated content (step 407), the simulated environment is applied based on the client modification parameters. This part is done when the modified HTML content is being rendered of after it has been rendered. Environment modification may include adding a client stylesheet, executing JavaScript to attach event listeners to the elements of the HTML content as well as modifying the behavior of the browser that is rendering the content itself such that it mimics the characteristic of the type of browser that the selected client is run on—this is especially advantageous when the selected client is a desktop client such as MICROSOFT® OUTLOOK® or mobile client.

In the case wherein the target environment is a mobile client, certain additional modifications may be advantageous. Unlike desktop and web clients, certain user interactions are either not available or are handled differently by the client. For example since the majority of mobile clients do not employ a cursor, there is no concept of a "hover" whereby a user places the cursor over an element. In web or desktop environments designers can create HTML content that responds to a hover event by using the ":hover" pseudo-class on an element. By using the :hover pseudo-class for example, elements can alter their style properties when users hover the cursor over an element such as color, width, height and padding, adding an element of interactivity to the document. One of ordinary skill in the art would appreciate that there are numerous types of interactions that are implicated by mobile clients, and embodiments of the present invention are contemplated for use with and for the processing of any such interaction.

On mobile environments that do not use cursors, some clients such as the iOS (iPhone) and Android clients trigger the hover event when the user performs a quick tap of the element that has been associated with a hover pseudo-class. When simulating a mobile client on a desktop web browser, it would be advantageous to treat the cursor as a user's finger and only trigger the hover event when the user has actually clicked (i.e. tapped) on an element—instead of triggering a hover event when the cursor is merely over the element. In the preferred embodiment, the simulation user interface uses a desktop web browser which will by default trigger the hover event when a cursor is placed over an element—and modifying the environment to simulate a mobile hover experience instead. The simulation may also be run on a mobile browser, wherein the interaction modifications would be reversed—wherein web/desktop client environments and interactions are simulated in a mobile browser.

The following discusses the process of modifying the hover interaction handling of a desktop web browser (or any browser that responds to a hover event using a pointing device such as a mouse) so that a hover event is only triggered when a user clicks on an element and not when the user places the cursor over an element. The original HTML document may assign the :hover pseudo-class to elements that are set to respond to hover events. In order for the browser to not trigger a hover event on a cursor hover, in an exemplary embodiment, the application converts ":hover" pseudo-classes to regular classes at the markup modification phase (FIG. 4 step 404). For example, :hover can be changed to a regular named class such as myhover so that declarations such as .mydiv:hover becomes .mydiv.myhover. Then during the environment modification phase 407, a script is run where click event listeners are bound to elements originally having :hover pseudo-classes. When the click event listener is fired, the myhover class is added to the element, thus making active the styles that have originally been assigned the :hover pseudo-class. However, there is also a need to undo the application of the myhover class once the user has clicked on another element. This can be done by keeping a list of elements that the myhover class has been applied to and removing the classes from those elements before applying the class to elements that have the abovementioned click listener that have been recently clicked on. In a preferred embodiment of the invention, the elements receiving a click event are queued into a list and elements previously having being added the hover class have the hover class removed, before the hover class is added to the newly clicked on elements.

Some mobile environments also only trigger hover events when certain specific type of elements are touched (i.e. images or links), so to mimic that behavior, click events may be selectively applied to those types of elements within the elements having hover pseudo-classes. This can be done using query selectors—so if the original style was .myclass:hover, and only links may trigger hover events, the query-Selector used to target links within the element may look like ".myclass a" wherein click events are then added only to the links and not the initial element itself.

One skilled in the art can appreciate that other CSS classes and pseudo-classes may be simulated in the manner above. It would also be advantageous to simulate media queries as well. Media queries are CSS blocks that become active when certain conditions are met, such as "max-width", wherein the block within the query is active only if the current browser or client width is smaller than the max-width variable.

@media max-width: 330px { . . . }

There are some media queries target the device such as "max-device-width". In order for the media query targeted to device dimensions to be active within a simulated environment a few methods may be employed. Firstly during the markup modification phase, the system can detect device or environment specific CSS media queries and make them active by default if the system determines that the CSS block would be active (or enabled) in the target client environment. This is in effect removing the media query filter itself and having the block of CSS within the media query be automatically active. An alternate approach would be to modify the browser running the simulation to respond to media queries differently depending on the simulated client environment. It is more advantageous to take the former route as it does not require the modification of the browser.

Other methods to simulate client environments may be used in conjunction with the methods described above. Some other simulation of mobile environments include simulating the effect of (i) meta tags specific to mobile environments such as "viewport", wherein JavaScript is used to simulate mobile behavior when the viewport meta tag is present—for example when width restrictions are set in the viewport meta tag, the application can create boundaries for the content container to match the width restrictions (ii) styles specific to mobile client environments such as the IOS® Mail app setting a minimum font size and modifying fonts within the HTML content to comply with said restrictions or detecting styles settings such as "-webkit-text-size-adjust:none" wherein the font size restriction is overridden.

A preferred embodiment of the invention also includes the ability to programmatically determine discrepancies in the rendering between the original HTML content and the HTML content within a list of client environment. This allows the system to notify the user to identify potential rendering and layout issues without the user having to manually view the rendering of the HTML content in multiple client environments. The discrepancy detection can be done by having the original HTML content being modified to simulate a plurality of client environments, and then performing one or more of the below processes using the client environments: (i) parsing the DOM Tree to determine elements that may have been removed or added; (ii) obtaining the computed style of one or more DOM element within the client environment compared to the computed style in the original document; (iii) parsing the styles to detect the application, or removal of styles and pseudo-classes such as :hover to detect if there will be changes of behavior between the original HTML document and the selected client environment; or (iv) any combination thereof. With respect to (iii) above, specifically checking the computed style's width and height of an element allows the system to quickly determine if there is a discrepancy in the layout of both documents. It further allows the system to check other discrepancies as well as other attributes including but not limited to as font, color, border, padding, margin, spacing and line-height. The computed style may be computed using JavaScript such as using document.defaultView.getComputedStyle(element) or element.currentStyle for Internet Explorer. One of ordinary skill in the art would appreciate that there are numerous methods that could be utilized to make such determinations, and embodiments of the present invention are contemplated for use with any such method. The application can then highlight the discrepancies on the various client environments the user using the simulation tool so that the user can perform a simulation on said environments to delve into the discrepancies.

Part 3: Detection of Outlier Clients

As email clients and web browsers get more and more sophisticated, the capability gap between new clients and old clients get larger and in certain cases use of new features within HTML content such as HTML5 and CSS3 cause rendering problems on old clients. A common method to address this is to only use a narrow set of features in HTML content to support these clients. However as the old clients become fewer and fewer, the value in supporting the old clients diminishes. Yet it would be advantageous to allow users using the old clients to signal that they would like content that render properly in their clients as well as a way for email senders to send content that render properly for these clients.

A method to allow users of old clients to signal to the sender that the user is using an old client is that the sender may place text or links within an email message that is only visible when viewing the content on an old or "unsupported" client. Such techniques involve putting links to the "text only" ("text/plain" multipart mime) part of an email, or to portions of an HTML email that is specifically crafted such that the links or text would be hidden in modern clients or browsers. For example modern clients allow HTML elements to be effectively hidden by allowing one of the following style tags display:none; or overflow:hidden with height or width set to 0px. By putting text or links within those elements styled that way, only old clients that don't support those styles will display them.

These links, when clicked on or placed in a browser, could take the user to a service hosted on a server that record that the user is on an old or unsupported client and that future emails should take that into account. The links may have identifiers identifying the user or user's email address embedded or encoded into them so that the hosted service can easily determine the email address of the user. When the service receives the request, the user's record is updated to reflect that the user is on an old or unsupported client.

Later during the process of sending an email to said recipients, the application that is processing the email to be sent can modify the email so that it renders correctly on their clients. The creator of the HTML content being sent may provide hints to the application within the HTML content signifying portions of the content that should be modified including the replacement portions for old clients that do not support more advanced functionality—such as using conditional comments or application specific directives.

An alternate and more conservative method to deal with outlier clients is to embed links to tiny images on a server or "pixels" that will only be loaded by newer and more advanced clients. This can be done by placing the images using the more advanced CSS styles such as background:url(<image link>) which will be ignored by old clients. The links to images embed identifiers identifying the user or user's email address and when loaded from a server, the server is able to identify that the user is on a modern client and to update this information in the user's record. Later when email is sent, a process sending the email will modify the HTML content such that users not having a record that they are on a modern client will be sent emails that only render on old clients.

Part 4: Reporting of Triggering of Interactive Elements in Clients

Certain clients support specific elements, such as the CSS :hover pseudo-class. As mentioned previously the :hover pseudo-class support allows for interactivity within the HTML content. It is desirable to detect when interactive elements are triggered by users remotely especially in the case of email where the ability to detect the triggering of an interactive element allows the sender to determine both users using a client that supported interactive element as well as whether the addition of interactive elements affected the results of an email campaign.

A preferred method to detect if an interactive element has been triggered by a user in a client is to place tiny images called pixels that are only displayed when an interactive element is triggered—wherein the image is loaded from a remote server and the URL of the image contains one or more identifiers that identifies one or both of—the user (or email) and the interactive element being triggered such that the remote server is able to record the triggering event and connect the event to the user and/or the interactive element. Such a method may use for example by placing a <div> element within an element that is set to respond to a :hover event, wherein the background-image of that div element is set to a remote image once the hover event is triggered. An exemplary CSS may look like this:

```
.the_element:hover div {
    background-image:
url(http://removeserver.com/pixel?user=user@user.com&element=the_element);
}
```

Other methods to load pixels when an interactive element is triggered may be used. Other information may be encoded in the pixel as well which may include the email campaign identifier.

Part 5: Dynamic Imagery Link Synchronization

According to an embodiment of the present invention, the system and methods described herein use synchronization techniques on one or more servers in conjunction with a client (e.g., web browser such as MICROSOFT® INTERNET EXPLORER® or GOOGLE® CHROME®—or native email client such as MICROSOFT® OUTLOOK® or IPHONE® Mail app) or other software identification techniques to overcome current limitations and provide the ability to send a user to a URL or other hyperlink/content identifier (e.g., IP address) associated with one or more frames of an image being displayed to the user when the user clicks on the image. One skilled in the art can appreciate that the implementation does not necessary tie a specific URL to a specific frame, other methods can achieve a similar outcome, such as tying URLs to specific times within an animation timeline instead.

Although the techniques described herein apply to any animated image including animated gif, animated png and video, the descriptions herein will primarily focus on the implementation using animated gifs. One of ordinary skill in the art would appreciate that there are numerous forms of content that embodiments of the present invention could be used in conjunction with, and embodiments of the present invention are contemplated for use with any type of content.

While preferred embodiments of the present invention are contemplated for use with email content, other embodiments of the present invention can be equally beneficial in environments where the ability to embed or execute scripts on the web page (e.g., by a client) such as javascript is blocked or limited. One of ordinary skill in the art would appreciate that there are numerous environments that embodiments of the present invention could be utilized with, and embodiments of the present invention are contemplated for use with any type of environment.

Further, although preferred embodiments of the present invention are configured to process dynamic image synchronization through use of an animated image file, other embodiments of the present invention can be used to achieve the same effect while utilizing other content types, such as animated images generated on the fly from individual static images, or storing an animated image as several pieces such as storing the header and first frame as a file and the remainder frames as a separate file. One of ordinary skill in the art would appreciate that there are numerous types of content that could be utilized with embodiments of the present invention, and embodiments of the present invention are contemplated for use with any type of content.

Figure 6:
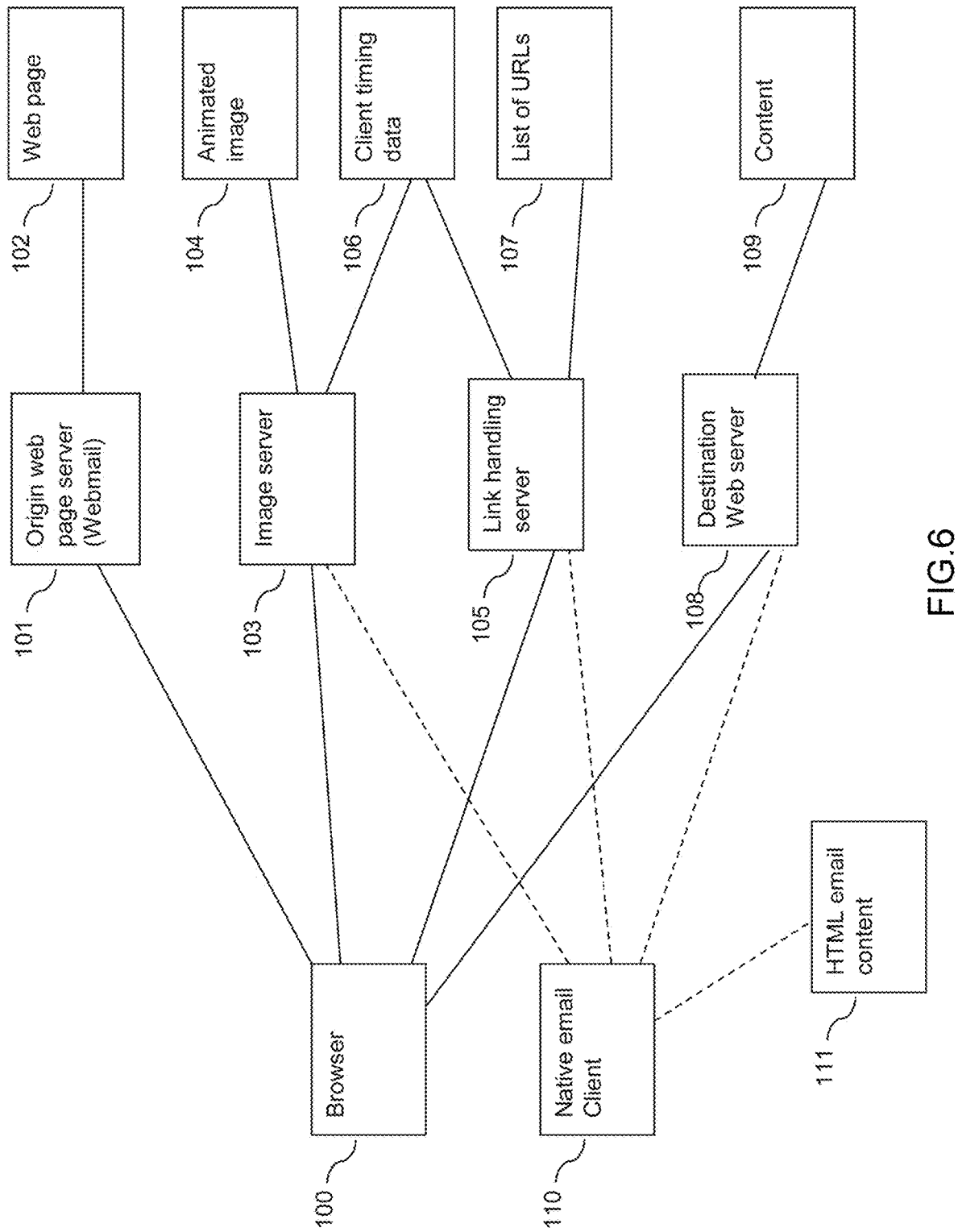
FIG. 6 is an overview diagram of an exemplary web based system for providing the system and methods described herein, in accordance with an embodiment of the present invention.

Turning now to FIG. 6, an overview diagram of an exemplary web based system for providing the system and methods described herein is shown. The diagram shows various entry points into the system by various types of clients (e.g., browsers 100, native email clients 110). Components of the system may include, but are not limited to, an origin web page serer 101, an image server 103, a link handling server 105 and a destination web server 108. While these components are shown in FIG. 6 as separate servers, one of ordinary skill in the art would appreciate that these components could be provided by a single physical server or any number of physical or virtual servers, whether residing on the same hardware or separate hardware and communicatively connected through one or more communications means (e.g., wireless connections, wired connections, software connections). Further, one or ordinary skill in the art would appreciate that embodiments of the present invention may be accomplished through the use of fewer or additional components than outlined in FIG. 6.

In FIG. 6, browser 100 interacts first with a webmail sever 101 for receipt of email from the webmail server 101. Native email client 110 is provided its email directly from an email server (not shown) in any number of ways such as using the POP, IMAP, Exchange or proprietary email protocols, as would be appreciated by one of ordinary skill in the art. Upon opening an email, both browser 100 and native email client 110 receive image data from image server 103. For the purposes of the present description, the image server 103 may provide an animated image 104 to the browser 100 or native email client 110. In preferred embodiments of the present invention, in conjunction with distributing the animated image 104, the image server 103 also places the client timing data (e.g., timer) 106 in a location that is accessible to link handling server 105—one embodiment of which is to place it on a cache server that is accessible by both the image server and link handler such as a server that runs memcached, or to save the timing data in a database that is commonly accessible such as a database running MySQL. Armed with the timing data 106, the link handling server can use one or more means to determine what frame is being displayed when browser 100 or native email client 110 send a link request to the link handling server 105. The link handling sever 105 will process the link request in conjunction with the timing data 106 to select the appropriate URL from the list of URLs 107 and forward the client to the appropriate destination web server 108 for the content 109 desired by the user of the client.

It should be noted that, in preferred embodiments of the present invention, the browser/client timing data 106 is an integral part to identifying the appropriate link and content associated with the link that is desired by the user. In its simplest form, by noting the transmission time and/or estimating a receipt and/or display time of the animated image 104 to the browser 100 or native email client 110, the link handling server 105 is capable of identifying what frame of animated image 104 is being viewed by the user at the time the user interacts (e.g., clicks) the animated image 104 and therefore knows what content 109 to send to the client, based on the frame being displayed to the user.

The determination of the timing data may be based, at least in part, on other information known to the system. For instance, the system may be provided various forms of metadata that could be utilized to determine a best time to start the timer. Metadata that could be used for this purpose include, but are not limited to, browser type, browser version, email client type, email client version, packet size, connection type, connection speed, latency, service provider, client operating system, or any combination thereof. One of ordinary skill in the art would appreciate that there are numerous types of metadata that could be utilized with embodiments of the present invention, and embodiments of the present invention are contemplated for use with any type of metadata.

One important aspect to control for is the variance in transmission rates and network quality between the components of the system and the computing device of the user, an important part of which includes determination of network speeds. When determining network speeds to determine if the rate of delivery of an animated image is too slow, one method is to send a portion of data back to the client and record how much time has elapsed for a set amount of data to be delivered. Ideally this calculation is done during the delivery of the first frame so mitigation techniques can be employed such as aborting the delivery of the rest of the frames.

However, in most modern operating systems, the TCP socket buffer limit is normally defaulted to a value of 64K or higher (some much higher) and as a result if the frame or image size is smaller than 64K, the entire frame or image may be consumed by the buffer giving the impression to the application that the data has been sent when it has not. There are two methods to deal with this: 1) To set the TCP socket buffer's maximum size to a much smaller value so that the frames will not fit within the buffer size (such as 20K) and thus the buffer will only consume the rest of the frame data once sufficient data has been transmitted to the client allowing the application to compute a more accurate throughput speed of the connection; or 2) Increase the payload of the image before the next non-transparent frame. This can be done either by inserting frames between the first frame and the next non-transparent frame such that the size of the frame makes the payload prior to the next non-transparent frame larger than the TCP buffer or to alter non-image portions of the payload (such as text and application extensions and comments) to fill it with random non-consequential but valid data.

Since embodiments of the present invention utilize server side processing to provide the synchronization functionality described herein, embodiments of the system work equally well with cases where a) a web browser (e.g., MOZILLA® FIREFOX®) is loading a web page containing one or more animated images with an associated link from a web server (e.g., webmail), and b) a native email client (e.g., MICROSOFT® OUTLOOK®) that loads HTML content from its internal data store. One advantage of utilizing server side processing is that no code or script is required to be executed by the client, making embodiments of the present invention platform independent and agnostic. There is no requirement that a client be utilizing any particular software, browser, operating system or other component other than the ability to process and display animated images such as animaged gifs. This allows the system to be utilized on any platform, including mobile devices and other devices with limited processing power.

Figure 7:
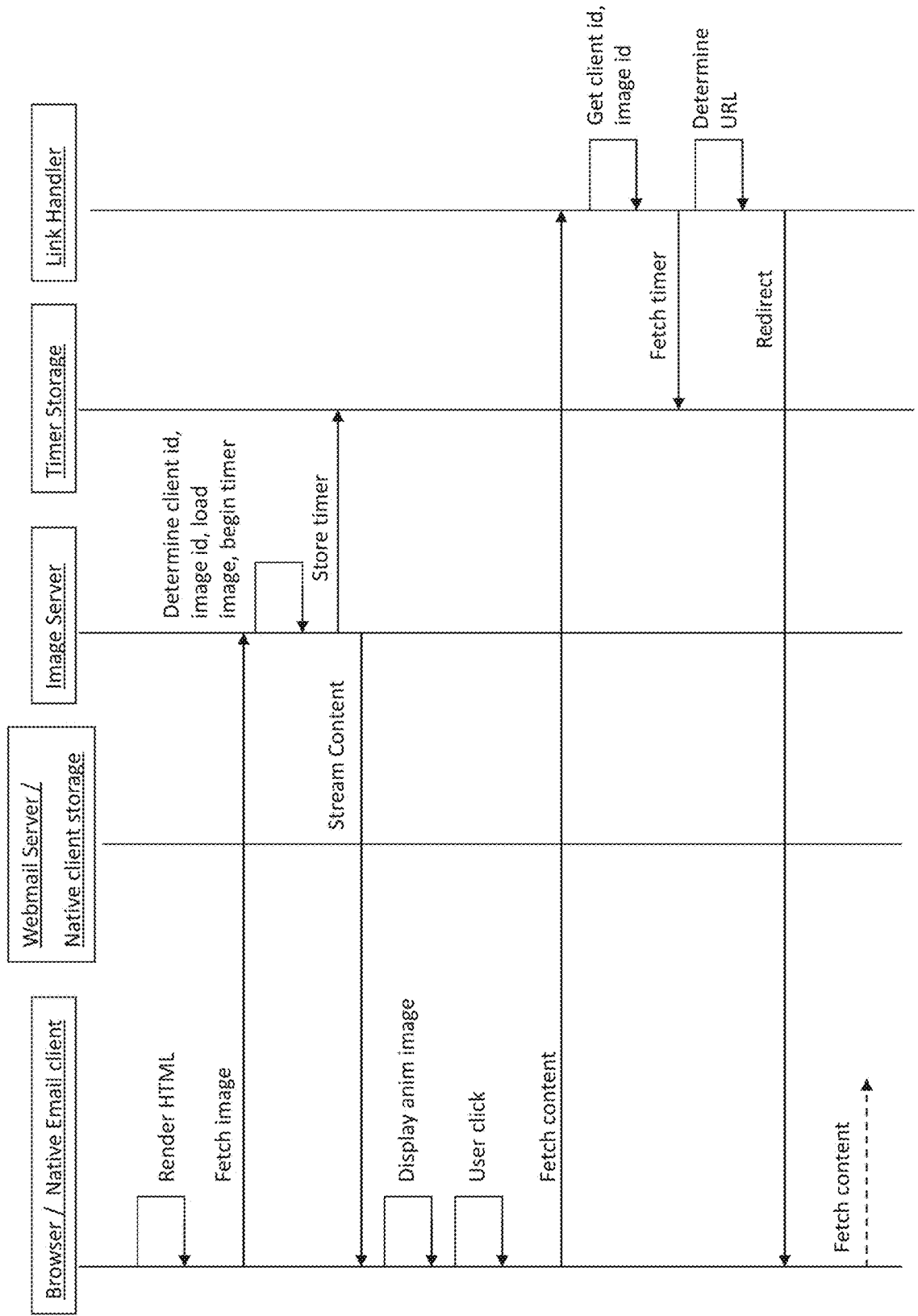
FIG. 7 is an interaction diagram, in accordance with an embodiment of the present invention.

FIG. 7 is an interaction diagram, in accordance with an embodiment of the present invention. FIG. 7. details an exemplary flow of what happens when a request is made by the client to retrieve an animated image, in a preferred embodiment of the present invention. In an exemplary embodiment, "timing data" (timer) may be formatted in the following manner:

```
Timing Data format:
    { "image_id": "img1000",
      "client_id": "client1@client.com",
      "start_time": 1359759420
      "loop":2,
      "total_anim_time": "13.2",
      "urls":[
          {"time":"0", "url": "http://url1.com"},
          {"time":"4.4", "url": "http://url2.com"},
          {"time":"8.8", "url": "http://url3.com"}
      ] }
```

In the above pseudo-code format, the image_id is an identifier of the image that is sent to the client (this identifier may not necessarily be an image identifier, but could be some other identifier such as a campaign identifier that has a relation to the image sent), the client_id could be comprised of identification information, including, but not limited to, one or more of a cookie id, an IP address, an email, hashed value of the aforementioned values, or any combination thereof. The start time could be configured in any appropriate format (e.g., epoch (seconds since midnight Jan. 1, 1970) GMT, a string designating a specific date and time at a specific timezone). Loop defines the number of times the animation will loop once it reaches the end of the sequence of images and the total_anim_time defines the total duration of the animation/video. URLS indicates the various links that may be provided, depending on when the image is interacted with by the user (e.g., 0-4 seconds url1, 4.4-8.8 seconds url2 and 8.8-13.2 seconds url3. One of ordinary skill in the art would appreciate that this is merely an example and there are numerous ways to format and provide the encoding for such timer data, and embodiments of the present invention are contemplated for use with any type of timing data.

Figure 8:
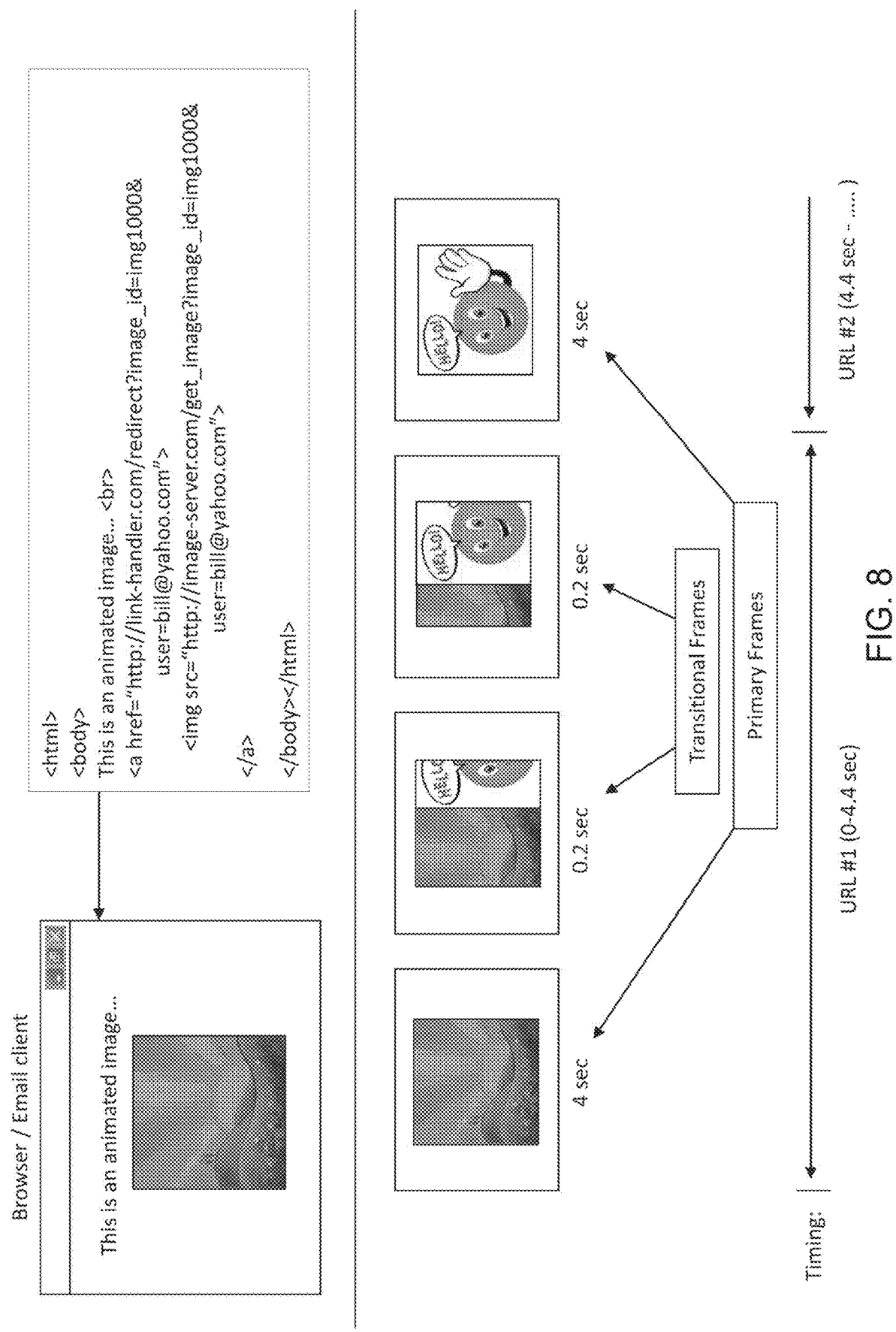
FIG. 8 is a timeline that details transitioning of an animated image and link as embedded in an HTML document (e.g., HTML email), in accordance with an embodiment of the present invention.

Turning now to FIG. 8, a timeline that details transitioning of an animated image and link as embedded in an HTML document (e.g., HTML email), in accordance with an embodiment of the present invention, is shown. The top portion of FIG. 8 shows pseudo-code for the inclusion of an animated image in an email (HTML format). In an exemplary embodiment, the image url and the link that wraps the image may be formatted in the following manner:

image url: http://image-server.com/get image?image_id=img1000&user=bill@yahoo.com link: http://link-handler.com/ redirect?image_id=img1000&user=bill@yahoo.com In the above example, image_id identifies the image to be sent back to the client and the "user" parameter can be used as a client identifier. Although the image url and link refer to different servers, there is no requirement that it is so and both the image and link can be served and handled by the same server. Also as discussed elsewhere in this document, the user parameter is not mandatory as there can be multiple methods to determine a suitable client identifier (client id). In the above example, the image id and client id together serve as a key that the timing data (timer) linked with. However other methods to generate a key for the timer can be used such as using only the client_id or the link instead of having both an image_id and a client_id the link contains a single id that allows the image server to uniquely identify both the image and client. Also an alternative to a regular link, the link could also be an image map link, where different coordinates of the image is associated with a different link. The image map can be either client side where the coordinates are mapped to links within the page or server side where the coordinates of the activated (clicked or touched) event within the image is sent to the server and the server uses the coordinates to determine which area the image has been activated (clicked/touched) and to send the user to an appropriate link. Using an image map allows multiple links to be associated with a frame of the animation. The exemplary disclosure references a regular link although one skilled in the art can appreciate the opportunities to use image maps with said invention.

The bottom portion of FIG. 8 shows the progression of an animated image through various frames/phases. In this embodiment, the animated image may have one or more transitional frames allowing for the transition between a first and second image (primary frames) of the image set of the animated image. Transitional frames may be identified by either the short amount of delay the frame is viewable before being replaced (eg. less than 1 second) or that the frame can be marked as a transitional frame by adding data to the metadata of the frame, for example by setting an application specific flag within a gif frame's application extension block The system described herein can handle these transitional frames in a number of manners, including, providing each frame with their own link, grouping together a non-transitional frame with the next sequential transitional frames with one link, providing one or more of the transitional frames with their own link, providing only the non-transitional frames with their own links, providing some of the transitional frames links but not others, providing some of the non-transitional frames with their own links and not others, and any combination thereof.

Figure 9:
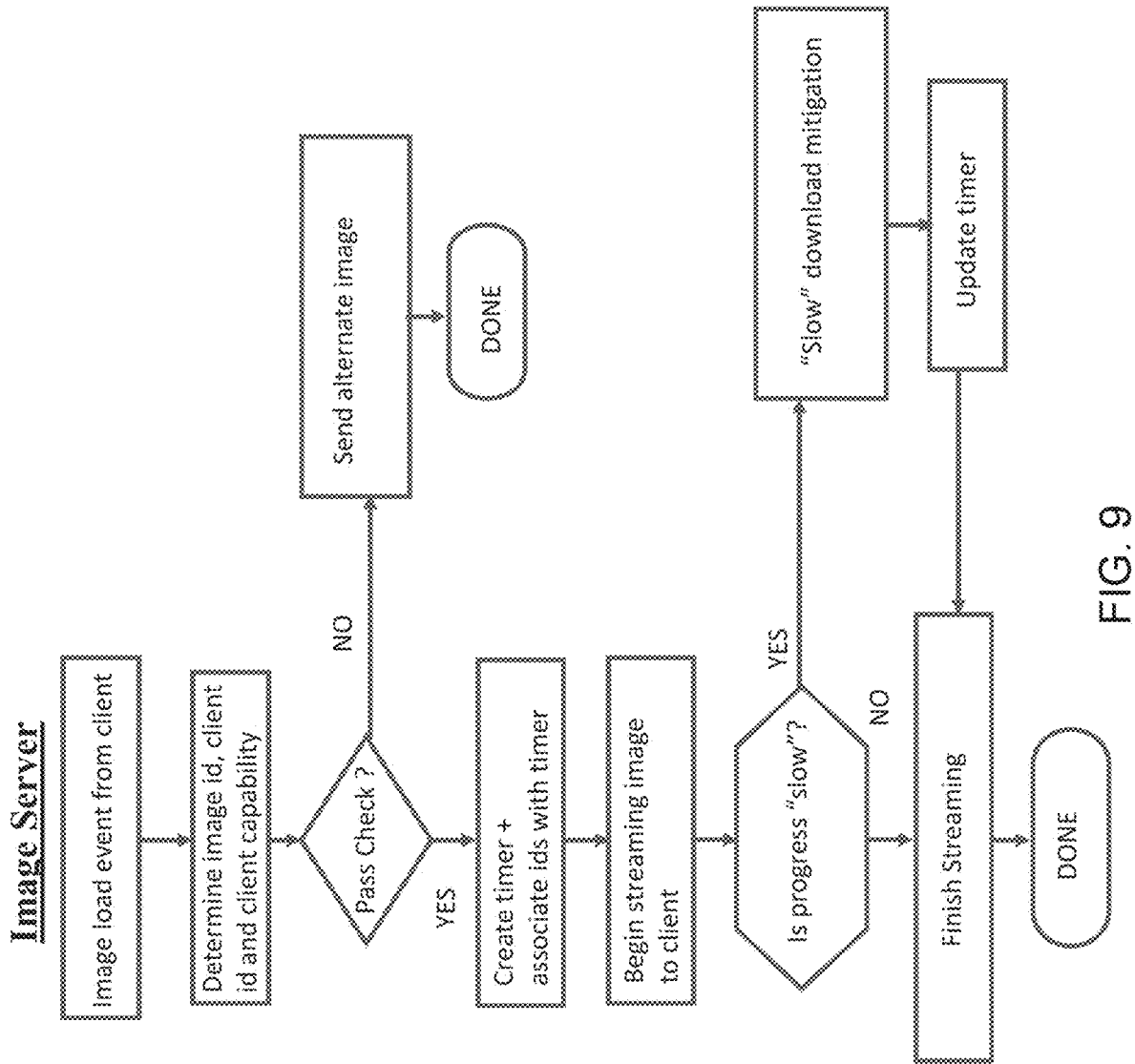
FIG. 9 is an illustration of an exemplary process flow, in accordance with an embodiment of the present invention.

FIG. 9 is an illustration of an exemplary process flow, in accordance with an embodiment of the present invention. The process of FIG. 9 follows the actions of an image server acting in conjunction with an embodiment of the present invention. At the first step, the image server receives a request from a client to receive an image requested from code embedded in an email (e.g., HTML). The image server then determines the identifier of the image being requested (image_id), an identifier for the client requesting the image (client id) and the capabilities of the client to display and handle animated images and other capabilities (optional). In an exemplary embodiment, the capability check is being done by reading the "User Agent" string being passed along with the request by the client. The User Agent string may inform the application the type of client that is accessing the server (such as MOZILLA® FIREFOX®, MICROSOFT®

OUTLOOK®). Based on the knowledge of the client, the image server may make a determination that the client is not suitable (e.g., certain versions of MICROSOFT® OUT-LOOK® will not display the animation within an animated image). The client identifier may be based at least in part on one or more of a cookie, a specific parameter within the image url that is used as a client id, an IP address, a hostname, metadata associated with the embedded code, or any combination thereof. One of ordinary skill in the art would appreciate that there are numerous methods for determining the identity of a client requesting an image from an image server.

If no client_id is available, or if the application deems that the client is not capable to either render the animated image or pass any other predefined criteria, the image server can be configured to provide a default image to the client. This image would have a single URL associated with it so that no matter what frame the user clicked on, the endpoint would be the same content located at the specified URL. In this specific embodiment, no timing data is created since the timing is not relevant. However in other embodiments timing data can be created but marked that an image with a single url has been sent to the client. At this point the process would end.

If a client_id was ascertained, the image server may create a timer and associate that timer with both the image_id and client_id using the combination as a key. This timer and associated information may be stored in a database, in memory, on a separate machine or other data store for later retrieval by the link handler. An expiry may be placed with the timing data to ensure that old timer data is eventually discarded or deemed invalid. The timer may contain multiple pieces of data that the link handler can use to determine which URL to send the client to an exemplary example disclosed earlier in this document. Among the data, for instance, may include a timestamp for the time at which the image is deemed to have begun displaying at the client. This timestamp may be approximate. In alternate embodiments, the timestamp may be the time the transmission began, the time the transmission began with a delay to take into account network delays determined by the connection speed, the time the transmission began with a delay determined by the specific characteristics of the client, upon a given delay, or any combination thereof. One of ordinary skill in the art would appreciate there are numerous methods for determining the best time to initiate the timer, and embodiments of the present invention are contemplated for use with any of these methods.

In conjunction with determining the optimal timer start time, the timer start time may be set or the timer itself being created during the process of streaming the image to the client. Also the User Agent string may be used to determine the characteristic of the image being delivered to the client. For example for mobile clients a version with less frames, different frame timing/loop settings, a smaller dimension/size optimized for small screens or a combination but not limited to the aforementioned may be sent to the client.

While the image is being streamed to the client, the image server may also be configured to determine if there is some error or other slowdown in the transmission or receipt of the image to the client. Errors and slowdowns include, but are not limited to, network issues, dropped packets, security issues, connection issues, bandwidth issues, or any combination thereof. One of ordinary skill in the art would appreciate that there are numerous impendences that may slow down or cause errors in the transmission and receipt of data between two points, any of which may be identified and processed by the present system. Assuming there are no slowdowns, the image finishes streaming and the process terminates.

If there are issues, the system may be configured to mitigate for the slowdown based on the specific error/slowdown type and corrective options available to the system. Options for dealing with slowdowns/errors include, but are not limited to, truncating an image at a frame boundary, dropping or altering transitional frames, altering frame timings, inserting bank or transparent frames into the image, or any combination thereof. If the slowdown is especially severe and if the slowdown is detected while the first (visible) frame is being streamed one exemplary corrective option is to finish streaming the first frame and terminating the streaming (discarding the remaining frames) giving the impression to the user that the image is a static image. A preferable point to create the timer object is once the first frame has been sent as this is a point where it is determined that the client will be able to process more than one frame in the image. One of ordinary skill in the art would appreciate that there are numerous types of corrective options that could be utilized with embodiments of the present invention, and embodiments of the present invention are contemplated for use with any type of corrective option. If a corrective option is applied, the system can be configured to correct/update the timer data to reflect the mitigation actions that have been taken which may include changes to timing or the elimination or addition of frames and finish streaming or otherwise complete the process and terminate. An additional measure that can be taken is to determine the type of client using the User Agent string retrieved and to look up in a pre-configured database client specific behaviors in relation to the processing of animated images during a delay or slowdown in network transmission. For example certain browsers may truncate the display of the frames in order to "catch up" to what it deems the proper timing of the animation, whereas others may respect the defined delay set within each frame and display them with the pre-set delay as the frames get delivered to the client. The application can match the client type to the behavior information and adjust the timing data to match what it calculates to be the progression of the animation at the client.

Figure 10:
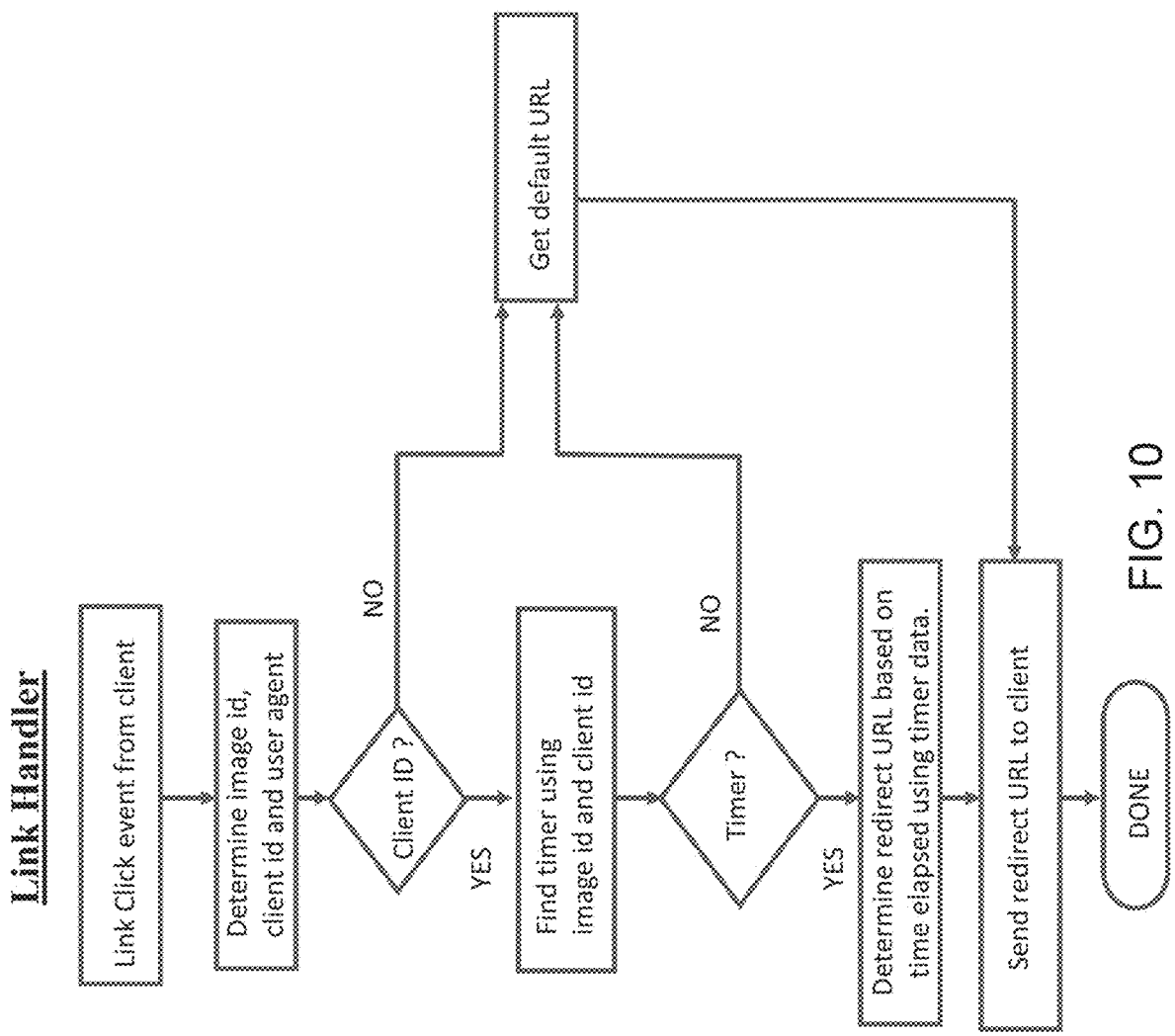
FIG. 10 is an illustration of an exemplary process flow, in accordance with an embodiment of the present invention.

FIG. 10 is an illustration of an exemplary process flow, in accordance with an embodiment of the present invention. FIG. 10 picks up after the image has begun streaming to the client of the process detailed in FIG. 9. Here, the client has received at least the first frame of the animated image and the user has decided to click on one of the images displayed. Upon clicking the image (or touch in the case of a touch based system such as an iPhone), a request is sent to a URL associated with the animated image. The request is processed by the link handler component of the system. The link handler checks the request for an associated image_id which is the same or deducible from the image_id in the url of the image is being clicked on, the User Agent of the client (optional), a client_id (as noted above, the client_id could be, for instance, a cookie, a parameter within the url of the link, IP or hostname). If no client_id exists, the link handler provides a default redirect URL for the click event and sends the redirect URL to the client. This default URL may be the URL associated with the first (visible) frame of the animated image.

If the requests contains an identifiable client_id and image_id, then the link handler attempts to retrieve a timer associated with the combination of both the client_id and image_id. If no timer exists, the link handler provides a single redirect URL for the click event and sends the redirect URL to the client. Other methods familiar to those skilled in the art may be used as a lookup key for the timer such as using only the client_id.

If the link handler is able to retrieve the timer associated with the client_id, the link handler determines an appropriate redirect URL based on the timer and the animated image associated with the timer. Using the timer and information regarding the animated images, as well as potentially using metadata included in the request, the link handler is able to determine which frame or image of the animated image was displayed to the user during the initiation of the click (or touch) event. This allows for the content of the redirect URL to be associated with the actual frames or images viewed by the user during the initiation of the click event. Once the system has determined the appropriate redirect URL, the system transmits the redirect URL to the client.

FIG. 11 is a diagram detailing 3 exemplary embodiments of an identifier capable of tying a client to timer data, in accordance with an embodiment of the present invention. In embodiment (a), pseudo code is shown whereby the user's e-mail address is used as the client_id. In embodiment (b), client-server communications are shown with respect to utilization of a cookie, or metadata contained in the cookie, as the client_id. Here a process is used to detect if a client supports cookies or 3rd party cookies. The initial request to fetch the image is responded with a redirect url back to the client that includes a generated cookie. The client then attempts to fetch the redirect url (in this case on the same server). If the cookie is present in the second request, the client is deemed to support cookies and a generated ID can be placed within the cookie and used as the client_id. If the cookie is missing, the client is deemed to not support cookies or 3rd party cookies (depending on domain setup) in this transaction. In embodiment (c), the client's IP or hostname is utilized as the client_id. While these three embodiments are descriptive of preferred embodiments for determining a client_id, one of ordinary skill in the art would appreciate that there are numerous methods for assigning and determining a client_id, and embodiments of the present invention are contemplated for use with any method for assigning and/or determining a client_id.

The animated gif creation process may involve stitching together multiple static images using existing techniques such as using command line tools such as IMAGEMAGICK® or gifsicle. An advantageous step in the creation of the final animated gif to be used by the image server, either by stitching a set of static images or an existing animated gif is to append the first frame of the animation to the end of the animation—especially in cases where the number of loops is finite. The reasoning for this is that this allows the timer data to "expire" and if the link handler receives a request from a client at a time when the timer cannot be found or has expired (i.e. the user sat on the page for a very long time and then decides to click on the image), that the link handler can select the URL associated with the first frame and return the link to the client. If the first frame is not appended to the end of the animation, the link handler would have to retain the timer data for an indefinite period to detect that the user clicked on the last frame after the animated gif has stopped running.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer-implemented method to simulate an interactive structured document as it would behave on different types of media devices, the method comprising:

receiving, via a user interface, a user request to render, in a web browser executing on a computing device of a first type, a document comprising hypertext markup language (HTML) content, wherein the user interface comprises a web page loaded in the web browser, and wherein the computing device of the first type is controlled by a user-controlled cursor;

receiving, via the user interface, user selection of a target client environment of a computing device of a second type, wherein the computing device of the second type is touch driven;

identifying at least one CSS text comprising a :hover CSS pseudo-class associated with a first element within the document;

renaming the identified CSS text wherein the CSS text associated with the first element no longer comprises a :hover CSS pseudo-class and is not activated when the user hovers the user-controlled cursor over the first element within the document;

attaching a click handler to the first element within the document;

detecting via the user interface a click event by the user on the first element within the document; and in response to the detecting the click event by the user on the first element, the click handler activating the styles of the identified CSS text, wherein the click event results in the simulation performing as if the user had hovered the user-controlled cursor over the first element.

2. The method of claim 1, further comprising:

detecting a click event by the user on a second element within the document; and deactivating the styles of the identified CSS text on the first element within the document.

3. The method of claim 1, wherein the user interface is controlled by a pointer device, and wherein the document is rendered in a web browser that natively activates the styles of the identified CSS text in response to a hover event generated when a pointer device is over the first element.

4. The method of claim 3, wherein the pointer device further comprises a mouse.

5. The method of claim 1, wherein renaming the identified CSS text further comprises changing the identified :hover CSS pseudo-class into a regular CSS class.

6. A computer-implemented method to simulate an interactive structured document as it would behave on different types of media devices, the method comprising:

receiving, via a user interface, a user request to render, in a web browser executing on a computing device of a first type, a document comprising hypertext markup language (HTML) content, wherein the user interface comprises a web page loaded in the web browser, and wherein the computing device of the first type supports a user-controlled cursor;

receiving, via the user interface, user selection of a target client environment of a computing device of a second type, wherein the computing device of the second type is touch driven;

identifying at least one :hover CSS pseudo-class associated with a first element within the document;

disabling the identified :hover CSS pseudo-class from responding to hover events generated when a cursor is above the first element within the document, wherein disabling the identified :hover CSS pseudo-class from responding to hover events further comprises changing the identified :hover CSS pseudo-class into a regular CSS class;

attaching a click handler to the first element within the document;

detecting via the user interface a click event by the user on the first element within the document; and in response to the detecting via the user interface the click event by the user on the first element within the document, activating the styles of the identified :hover CSS pseudo-class, wherein the click by the user results in the simulation performing as if the user had hovered, wherein activating the styles of the identified :hover CSS pseudo-class comprises adding the regular CSS class to the first element wherein activating the styles of the identified :hover CSS pseudo-class comprises adding the regular CSS class to the first element.

* * * * *